United States Patent
Weigel et al.

(10) Patent No.: US 9,433,936 B2
(45) Date of Patent: Sep. 6, 2016

(54) DEWAXING CATALYSTS

(71) Applicants: Scott J. Weigel, Allentown, PA (US); Joseph Emmanuel Gatt, Beaumont, TX (US); Darryl Donald Lacy, Easton, PA (US); Randall D. Partidge, Califon, NJ (US); Kun Wang, Bridgewater, NJ (US); Lei Zhang, Basking Ridge, NJ (US); Christine Nicole Elia, Bridgewater, NJ (US)

(72) Inventors: Scott J. Weigel, Allentown, PA (US); Joseph Emmanuel Gatt, Beaumont, TX (US); Darryl Donald Lacy, Easton, PA (US); Randall D. Partidge, Califon, NJ (US); Kun Wang, Bridgewater, NJ (US); Lei Zhang, Basking Ridge, NJ (US); Christine Nicole Elia, Bridgewater, NJ (US)

(73) Assignee: EXXONMOBIL RESEARCH AND ENGINEERING COMPANY, Annandale, NJ (US)

( * ) Notice: Subject to any disclaimer, the term of this patent is extended or adjusted under 35 U.S.C. 154(b) by 134 days.

(21) Appl. No.: 14/196,019

(22) Filed: Mar. 4, 2014

(65) Prior Publication Data

US 2014/0274664 A1 Sep. 18, 2014

Related U.S. Application Data

(60) Provisional application No. 61/782,495, filed on Mar. 14, 2013.

(51) Int. Cl.

| | |
|---|---|
| *B01J 29/06* | (2006.01) |
| *B01J 29/76* | (2006.01) |
| *B01J 29/12* | (2006.01) |
| *B01J 29/74* | (2006.01) |
| *B01J 29/14* | (2006.01) |
| *B01J 29/44* | (2006.01) |
| *B01J 29/46* | (2006.01) |
| *B01J 29/78* | (2006.01) |
| *C10G 45/64* | (2006.01) |
| *C10G 45/02* | (2006.01) |
| *C10G 45/06* | (2006.01) |
| *C10G 45/10* | (2006.01) |
| *C10G 45/12* | (2006.01) |
| *C10G 45/62* | (2006.01) |
| *C10G 3/00* | (2006.01) |
| *B01J 37/00* | (2006.01) |

(52) U.S. Cl.
CPC ............ *B01J 29/7661* (2013.01); *B01J 29/12* (2013.01); *B01J 29/126* (2013.01); *B01J 29/14* (2013.01); *B01J 29/44* (2013.01); *B01J 29/46* (2013.01); *B01J 29/7415* (2013.01); *B01J 29/7461* (2013.01); *B01J 29/7492* (2013.01); *B01J 29/7615* (2013.01); *B01J 29/7815* (2013.01); *B01J 29/7861* (2013.01); *C10G 3/44* (2013.01); *C10G 3/47* (2013.01); *C10G 3/48* (2013.01); *C10G 3/50* (2013.01); *C10G 45/02* (2013.01); *C10G 45/06* (2013.01); *C10G 45/10* (2013.01); *C10G 45/12* (2013.01); *C10G 45/62* (2013.01); *C10G 45/64* (2013.01); *B01J 37/0009* (2013.01); *B01J 2229/186* (2013.01); *B01J 2229/20* (2013.01); *B01J 2229/42* (2013.01); *C10G 2300/1014* (2013.01); *C10G 2400/02* (2013.01); *C10G 2400/04* (2013.01); *Y02P 30/20* (2015.11)

(58) Field of Classification Search
USPC ................... 502/73, 74, 77, 78, 79
See application file for complete search history.

(56) References Cited

U.S. PATENT DOCUMENTS

| | | | |
|---|---|---|---|
| 8,138,384 B2* | 3/2012 | Iaccino ............... | C07C 2/66 585/407 |
| 8,263,517 B2 | 9/2012 | Elia et al. | |
| 2006/0073962 A1* | 4/2006 | Murphy ............... | B01J 29/064 502/64 |
| 2006/0086644 A1* | 4/2006 | Murphy ............... | C10G 45/64 208/111.01 |
| 2011/0192766 A1 | 8/2011 | McCarthy et al. | |
| 2012/0142984 A1* | 6/2012 | Roberts ............... | C10G 45/58 585/275 |
| 2013/0259775 A1* | 10/2013 | Levin ................ | B01J 29/064 422/634 |
| 2013/0338414 A1* | 12/2013 | Fingland ............. | C10G 45/10 585/310 |

FOREIGN PATENT DOCUMENTS

| | | |
|---|---|---|
| WO | 2006028884 A1 | 3/2006 |
| WO | 2009085290 A1 | 7/2009 |
| WO | 2011100218 A1 | 8/2011 |
| WO | 2012082376 A1 | 6/2012 |

OTHER PUBLICATIONS

The International Search Report and Written Opinion of PCT/US2014/020616 dated Jun. 13, 2014.
Weckhuysen, Bert M., "Metal-Support Interactions," Handbook of Heterogeneous Catalysis, 2008, Part 3, pp. 1178-1188.

* cited by examiner

*Primary Examiner* — Elizabeth Wood
(74) *Attorney, Agent, or Firm* — Robert A. Migliorini (57) ABSTRACT

Provided are catalysts including: a zeolite component selected from zeolites having 10-member ring pores, zeolites having 12-member ring pores and a combination thereof, 0.1 to 5 weight % of a hydrogenation component selected from Pt, Pd, Ag, Ni, Co, Mo, W, Rh, Re, Ru, Ir and a mixture thereof, and a hydrothermally stable binder component selected from tantalum oxide, tungsten oxide, molybdenum oxide, vanadium oxide, magnesium oxide, calcium oxide, yttrium oxide, lanthanum oxide, cerium oxide, niobium oxide, tungstated zirconia, cobalt molybdenum oxide, cobalt molybdenum sulfide, nickel molybdenum oxide, nickel molybdenum sulfide, nickel tungsten oxide, nickel tungsten sulfide, cobalt tungsten oxide, cobalt tungsten sulfide, nickel molybdenum tungsten oxide and nickel molybdenum tungsten sulfide, cobalt molybdenum tungsten oxide and cobalt molybdenum tungsten sulfide, wherein the weight ratio of the zeolite to the hydrothermally stable binder is 85:15 to 25:75.

2 Claims, 2 Drawing Sheets

DEWAXING CATALYSTS

CROSS-REFERENCE TO RELATED APPLICATIONS

This application claims priority to U.S. Provisional Application Ser. No. 61/782,495 filed Mar. 14, 2013 and is herein incorporated by reference in its entirety.

FIELD

The present disclosure relates to catalysts for use in dewaxing and other hydrocarbon conversion processes and methods of using such catalysts. Specifically, this disclosure relates to a dewaxing catalyst comprising a zeolite component, a metal component for promoting hydrogenation and a hydrothermally stable binder component, and methods of using such catalysts.

BACKGROUND

Waxy feedstocks may be used to prepare basestocks having a high viscosity index (VI). However, in order to obtain a basestock having the low temperature properties suitable for most uses, it is usually necessary to dewax the feedstock. Dewaxing may be accomplished by means of a solvent or catalytically. Solvent dewaxing is a physical process whereby waxes are removed by contacting with a solvent, such as methyl ethyl ketone, followed by chilling to crystallize the wax and filtration to remove the wax. Catalytic dewaxing involves chemically converting the hydrocarbons leading to unfavorable low temperature properties to hydrocarbons having more favorable low temperature properties. Long chain normal paraffins and slightly branched paraffins readily solidify and thus result in generally unfavorable low temperature properties. Catalytic dewaxing is a process for converting these long chain normal paraffins and slightly branched paraffins to molecules having improved low temperature properties.

Catalytic dewaxing may be accomplished using catalysts that function primarily by cracking waxes to lower boiling products, or by catalysts that primarily isomerize waxes to more highly branched products. Catalysts that dewax by cracking decrease the yield of lubricating oils while increasing the yield of lower boiling distillates. Catalysts that isomerize do not normally result in significant boiling point conversion. Catalysts that dewax primarily by cracking are exemplified by the zeolites ZSM-5, ZSM-11, ZSM-12, beta and offretite. Catalysts that dewax primarily by isomerization are exemplified by the zeolites ZSM-22, ZSM-23, SSZ-32, ZSM-35, ZSM-48 and ZSM-50. To ensure adequate mechanical strength for use in a dewaxing reactor, such zeolite catalysts are generally combined with an inorganic oxide binder, such as alumina.

Figure 1:
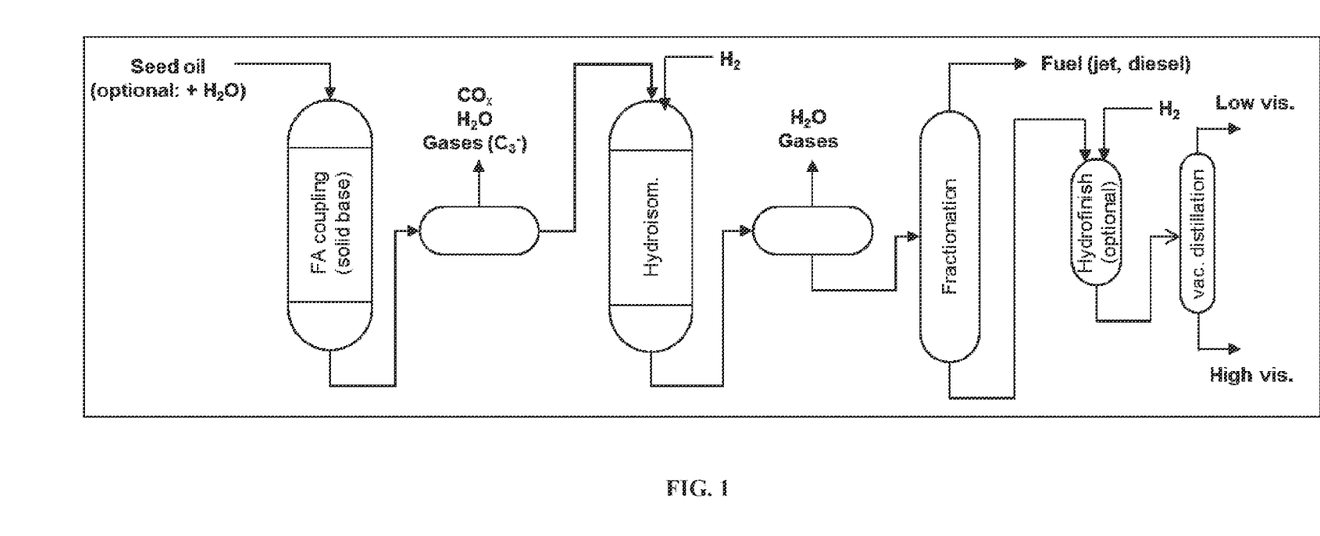
FIG. 1 is a scheme illustrating process flow schematic for the conversion of renewable feedstocks to higher value fuels and lubes products where a catalyst of the present disclosure can be placed into the hydroisomerization unit.

Catalysts are needed for the upgrading of renewable basestocks for fuels and lubricant applications. For example, a catalyst for fatty acid coupling helps production of a highly flexible feedstock. As shown in FIG. 1, this feedstock can then be hydrogenated and/or isomerized using conventional refinery processing, thereby producing high value products consisting of a mixture of fuels, high viscosity, and low viscosity lubricants. This product stream can easily be separated using conventional fractionation and distillation equipment.

The hydrogenation/isomerization catalyst for renewable feedstocks has several challenges to deal with: 1) a highly oxygenated feed (10% oxygen), 2) high heats of reaction, and 3) generation of water which is converted into steam in the reactor. The last challenge is of major concern to current dewaxing catalysts because steam can cause issues with the hydrothermal stability of the catalyst and can cause deactivation by dealuminating the zeolite catalyst and/or degradation of the oxide support/binder leading to agglomeration of the metal.

Conventional dewaxing catalysts are, however, susceptible to poisoning by contaminants in a feedstock. To mitigate the problem of catalyst poisoning and to allow effective dewaxing of feedstocks with very high levels of waxy materials, it is often desirable to be able to maximize the dewaxing activity of the catalyst. However, in seeking maximize activity, it is also important to maintain the mechanical strength of the catalyst.

U.S. Pat. No. 8,263,517 to Christine N. Elia describes a dewaxing catalyst comprising a zeolite with a low silica to alumina ratio in combination with a low surface area binder. The low surface area binder is believed to increase access to the active sites of the zeolite. Especially for bulky feeds, increased access to zeolite active sites is expected to lead to an overall increase in activity.

U.S. Patent Publication No. 2011/0192766 mentions a supported catalyst comprising a zeolite having a silica to alumina molar ratio of 500 or less, a first metal oxide binder having a crystallite size greater than 200 Å and a second metal oxide binder having a crystallite size less than 100 Å, wherein the second metal oxide binder is present in an amount less than 15 wt % of the total weight of the catalyst.

SUMMARY

The present disclosure relates to catalysts for use in dewaxing and other hydrocarbon conversion processes and methods of using such catalysts. In an embodiment, there is provided a catalyst comprising: a zeolite component selected from a zeolite having 10-member ring pores, a zeolite having 12-member ring pores and a combination thereof, 0.1 to 5 weight % of a hydrogenation component selected from Pt, Pd, Ag, Ni, Co, Mo, W, Rh, Re, Ru, Ir and a mixture thereof, and a hydrothermally stable binder component selected from tantalum oxide, tungsten oxide, molybdenum oxide, vanadium oxide, magnesium oxide, calcium oxide, yttrium oxide, lanthanum oxide, cerium oxide, niobium oxide, tungstated zirconia, cobalt molybdenum oxide, cobalt molybdenum sulfide, nickel molybdenum oxide, nickel molybdenum sulfide, nickel tungsten oxide, nickel tungsten sulfide, cobalt tungsten oxide, cobalt tungsten sulfide, nickel molybdenum tungsten oxide and nickel molybdenum tungsten sulfide, cobalt molybdenum tungsten oxide and cobalt molybdenum tungsten sulfide, wherein the weight ratio of the zeolite to the hydrothermally stable binder is 85:15 to 25:75.

In another embodiment, there is provided a catalyst comprising: a zeolite component selected from ZSM-48, ZSM-23, ZSM-50, ZSM-5, ZSM-22, ZSM-11, ferrierite, faujasite, beta, ZSM-12, MOR, and a mixture thereof, and a hydrogenation component comprising at least three metals selected from the group consisting of Pt, Pd, Ag, Ni, Co, Mo, W, Rh, Re, and Ru, wherein at least one of the at least three metals is in either an oxide or sulfide form. In an aspect of the present embodiment, the catalyst further comprises a binder component.

DETAILED DESCRIPTION

All numerical values within the detailed description and the claims herein are modified by "about" or "approximately" the indicated value, and take into account experimental error and variations that would be expected by a person having ordinary skill in the art.

The present disclosure provides a catalyst comprising; a zeolite component, a metal component for promoting hydrogenation and a hydrothermally stable binder component. In various embodiments, the zeolite component is selected from selected from a zeolite having 10-member ring pores, a zeolite having 12-member ring pores and a combination thereof; the metal component is selected from the group consisting of Pt, Pd, Ag, Ni, Mo, W, Rh, Re, Ru and a mixture thereof; and the hydrothermally stable binder component is selected from tantalum oxide, tungsten oxide, molybdenum oxide, vanadium oxide, magnesium oxide, calcium oxide, yttrium oxide, lanthanum oxide, cerium oxide, niobium oxide, tungstated zirconia, cobalt molybdenum oxide, cobalt molybdenum sulfide, nickel molybdenum oxide, nickel molybdenum sulfide, nickel tungsten oxide, nickel tungsten sulfide, cobalt tungsten oxide, cobalt tungsten sulfide, nickel molybdenum tungsten oxide and nickel molybdenum tungsten sulfide, cobalt molybdenum tungsten oxide and cobalt molybdenum tungsten sulfide. The catalysts provided herein have improved hydrothermal stability of the dewaxing catalysts which are, for example, used in conversion of renewable basestock. Also, the catalysts can minimize metal agglomeration, thereby improving catalytic selectivity and activity.

Figure 2:
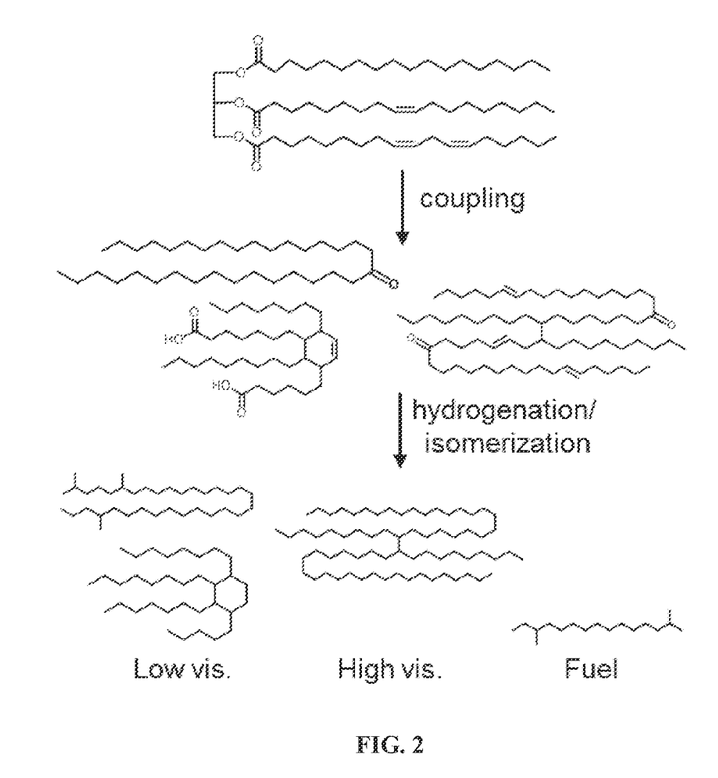
FIG. 2 is a scheme illustrating process chemistry for the conversion of renewable feedstocks.

As shown in FIG. 2, a solid base catalyst such as La/$ZrO_2$ converts natural oils via coupling reactions to ketone or acid functionalized feedstocks. The catalyst of the present disclosure is used in the next stage and is capable of doing the hydrogenation and/or isomerization in the presence of water and $CO_2$ without significantly cracking the molecules to gaseous products.

In various embodiments, a weight ratio of the zeolite component to the hydrothermally stable binder component can be controlled. In an embodiment, for example, the weight ratio of the zeolite to the hydrothermally stable binder is 85:15 to 25:75, particularly, 80:20 to 65:35. In particular embodiments, the ratio is 80:20 or 65:35.

In another embodiment, there is provided a catalyst comprising: a zeolite component selected from ZSM-48, ZSM-23, ZSM-50, ZSM-5, ZSM-22, ZSM-11, ferrierite, faujasite, beta, ZSM-12, MOR and a mixture thereof, and a hydrogenation component comprising at least three metals selected from the group consisting of Pt, Pd, Ag, Ni, Co, Mo, W, Rh, Re, and Ru, wherein at least one of the at least three metals is in either an oxide or sulfide form. The catalyst comprising a ternary metal component can be used in a conversion reaction without additional binder component. In an aspect of the present embodiment, the catalyst further comprises a hydrothermally stable binder.

Zeolite Component

A zeolite to be employed in the present catalyst composition can be selected based on the intended use of the catalyst. When the catalyst is to be used in isomerization dewaxing, suitable zeolites include those having 10-membered ring pores and particularly those having unidirectional 10-membered ring pores. Examples of suitable zeolites include ZSM-48, ZSM-23, ZSM-50, ZSM-5, ZSM-22, ZSM-11, ferrierite and combinations thereof. Other suitable zeolites include those having 12-membered ring pores and examples of suitable zeolites include from faujasite, beta, ZSM-12, MOR and combinations thereof. Also, suitable zeolites include a combination of a zeolite having 10-membered ring pores and a zeolite having 12-membered ring pores: for example, a combination of beta and ZSM-48.

In particular embodiments, ZSM-48 or ZSM-23 is used as the zeolite component, and the catalysts are particularly useful in the isomerization dewaxing of lube oil basestocks. Such feedstocks are wax-containing feeds that boil in the lubricating oil range, typically having a 10% distillation point greater than 650° F. (343° C.), measured by ASTM D86 or ASTM D2887. Such feeds may be derived from a number of sources such as natural oils like seed oils and animal fats, oils derived from solvent refining processes such as raffinates, partially solvent dewaxed oils, deasphalted oils, distillates, vacuum gas oils, coker gas oils, slack waxes, foots oils and the like, and Fischer-Tropsch waxes.

In a particular embodiment, the zeolite component is ZSM-48. ZSM-48 crystals, as used herein, is described variously in terms of "as-synthesized" crystals that still contain the organic template; calcined crystals, such as Na-form ZSM-48 crystals; or calcined and ion-exchanged crystals, such as H-form ZSM-48 crystals. ZSM-48 crystals after removal of the structural directing agent have a particular morphology and a molar composition according to the general formula:

$$(n)SiO_2:Al_2O_3$$

where n is from 70 to 210. In another embodiment, n is 80 to 100. In yet another particular embodiment, n is 85 to 95. In still other embodiments, Si may be replaced by Ge and Al may be replaced by Ga, B, Fe, Ti, V and Zr.

The as-synthesized form of ZSM-48 crystals is prepared from a mixture having silica, alumina, base and hexamethonium salt directing agent. In an embodiment, the molar ratio of structural directing agent:silica in the mixture is less than 0.05, less than 0.025, or less than 0.022. In another embodiment, the molar ratio of structural directing agent:silica in the mixture is at least 0.01, at least 0.015, or at least 0.016. In still another embodiment, the molar ratio of structural directing agent:silica in the mixture is from 0.015 to 0.025, preferably 0.016 to 0.022.

Particularly, the catalysts used in processes according to the disclosure have a zeolite component with a low ratio of silica to alumina. For example, for ZSM-48, the ratio of silica to alumina in the zeolite can be less than 200:1, less than 110:1, less than 100:1, less than 90:1, or less than 80:1. In a particular embodiment, the ratio of silica to alumina in the zeolite is less than 80:1, for example, particularly 70:1.

Hydrogenation Component

A hydrogenation component promotes the reaction of hydrogen with olefinic unsaturation in fatty acids, fatty acid dimers and oligomers, ketones, heavier oxygenates, and other intermediate reaction products. It further acts to reduce carbonyl, carboxyl, hydroxyl, and other oxygen containing groups to provide the saturated hydrocarbons as reaction products. Working in concert with other components in the dewaxing catalysts, it also provides isomerization functionality, helping to introduce sufficient branching in the final hydrocarbon products, where needed, to give basestocks with suitable pour point and low temperature properties.

Catalysts suitable for hydrogenation include metals such as Pt, Pd, Ag, Ni, Co, Mo, W, Rh, Re, Ru, Ir as well as binary or ternary mixtures thereof. In various embodiments, the metal hydrogenation component is a Group VIII noble metal. In non-limiting fashion, the metal hydrogenation component is Pt, Pd or a mixture thereof. In another embodiment, the metal hydrogenation component is a binary mixture, such as, for example, a combination of a non-noble Group VIII metal and a Group VI metal. Suitable combinations include Ni or Co with Mo or W, particularly Ni with Mo or W. In yet another embodiment, the hydrogenation component comprises at least three metals selected from the group consisting of Pt, Pd, Ag, Ni, Mo, Co, W, Rh, Re, and Ru, wherein at least one of the at least three metals is in either an oxide or sulfide form. In a particular embodiment, the metal component is (a) Ni, MoOx and WOx; or (h) Co, MoOx and WOx, wherein x is in the range of 0.5 to 3.

The metal hydrogenation component may be added to the catalyst in any convenient manner. One technique for adding the metal hydrogenation component is by incipient wetness. For example, after combining a zeolite and a hydrothermally stable binder, the combined zeolite and binder are extruded into catalyst particles. The catalyst particles are exposed to a solution containing a suitable metal precursor containing the Group VI or Group VIII metal. Alternatively, metal can be added to the catalyst by ion exchange, where a metal precursor is added to a mixture of zeolite (or zeolite and binder) prior to extrusion. The metal hydrogenation component may be steamed prior to use.

The amount of hydrogenation metal component may range from 0.1 to 5 wt %, based on catalyst. In an embodiment, the amount of metal component is at least 0.1 wt %, at least 0.25 wt %, at least 0.5 wt %, at least 0.6 w %, or at least 0.75 wt %.

Hydrothermally Stable Binders

The catalyst needs to be stable in the presence of water especially when excessive water is generated during a conversion reaction. In various embodiments, a catalyst of the present disclosure comprises a binder component to increase mechanical strength and stability of the catalyst in the presence of water under effective hydrogenation conditions. Such a binder is referred to herein as a "hydrothermally stable binder." Non-limiting examples of suitable binder components include tantalum oxide, tungsten oxide, molybdenum oxide, vanadium oxide, magnesium oxide, calcium oxide, yttrium oxide, lanthanum oxide, cerium oxide, niobium oxide, tungstated zirconia, cobalt molybdenum oxide, cobalt molybdenum sulfide, nickel molybdenum oxide, nickel molybdenum sulfide, nickel tungsten oxide, nickel tungsten sulfide, cobalt tungsten oxide, cobalt tungsten sulfide, nickel molybdenum tungsten oxide and nickel molybdenum tungsten sulfide, cobalt molybdenum tungsten oxide and cobalt molybdenum tungsten sulfide.

In an embodiment, a hydrothermally stable binder component is selected from binders capable of storing hydrogen, thereby keeping the metal in a reduced, highly dispersed state. Non-limiting examples of such binders include tungsten oxide, molybdenum oxide, vanadium oxide, and a mixture thereof.

In another embodiment, a hydrothermally stable binder component is a basic oxide, a binder capable of adsorbing carbon dioxide selectively or a binder which does not change to a denser phase upon exposure to steam and temperatures above 350° C. Non-limiting examples of such binders include magnesium oxide, calcium oxide, yttrium oxide, cerium oxide, niobium oxide, lanthanum oxide, zirconium oxide, and a mixture thereof.

In another embodiment, a hydrothermally stable binder component is a complex metal oxide used in hydroprocessing. Non-limiting examples of such binders include cobalt molybdenum oxide, cobalt molybdenum sulfide, nickel molybdenum oxide, nickel molybdenum sulfide, nickel tungsten oxide, nickel tungsten sulfide, nickel molybdenum tungsten oxide and nickel molybdenum tungsten sulfide.

In particular embodiments, the hydrothermally stable binder component is selected from lanthanum, cerium, niobium, nickel tungsten oxides, nickel tungsten sulfides, nickel molybdenum tungsten oxides, and nickel molybdenum tungsten sulfide.

A zeolite can be combined with a binder in any convenient manner. For example, a bound catalyst can be produced by starting with powders of both the zeolite and binder, combining and mulling the powders with added water to form a mixture, and then extruding the mixture to produce a bound catalyst of a desired size. Extrusion aids can also be used to modify the extrusion flow properties of the zeolite and binder mixture.

A catalyst comprising a ternary metal hydrogenation component has good hydrothermal stability with or without a binder. In an embodiment, to achieve improved stability, the catalyst may further comprise a binder selected from various metal oxides. Non-limiting examples of such binders include silica, alumina, silica-alumina, titania, zirconia, tantalum oxide, tungsten oxide, molybdenum oxide, vanadium oxide, magnesium oxide, calcium oxide, yttrium oxide, lanthanum oxide, cerium oxide, niobium oxide, titanium oxide, lanthanum oxide, zirconium oxide, tungstated zirconia, cobalt molybdenum oxide, cobalt molybdenum sulfide, nickel tungsten oxide, nickel tungsten sulfide, nickel molybdenum tungsten oxide, nickel molybdenum tungsten sulfide, and a mixture thereof, in particular embodiments, the hydrothermally stable binder is selected from lanthanum, cerium, niobium, nickel tungsten oxides, nickel tungsten sulfides, nickel molybdenum tungsten oxides, and nickel molybdenum tungsten sulfide.

Dewaxing Catalysts

A catalyst of this disclosure can be prepared by combining the three components, i.e., a zeolite, a hydrogenation component and a binder. Each of the three components can be selected from various components described herein, particularly choosing specific examples listed herein. In various embodiments, for example, the hydrogenation component is selected from Ni and Pt; the zeolite is ZSM-48 or ZSM-23; and the hydrothermally stable binder is selected from nickel molybdenum tungsten oxides, nickel molybdenum tungsten sulfide, $WO_3$, $La_2O_3$, $CeO_7$), and $Nh_2O_5$. Non-limiting examples of such catalysts include: (a) a catalyst comprising Ni, ZSM-48 and $WO_3$; (h) a catalyst comprising Ni, ZSM-23 and $WO_3$; (c) a catalyst comprising Pt, ZSM-48 and $La_7O_3$; (d) a catalyst comprising Pt, ZSM-48 and $CeO_2$; (e) a catalyst comprising Pt, ZSM-48 and $Nb_2O_5$; (f) a catalyst comprising Pt, ZSM-23 and $La_2O_3$; (g) a catalyst comprising Pt, ZSM-23 and $CeO_2$; (h) a catalyst comprising Pt, ZSM-23 and $Nb_2O_5$; (i) a catalyst comprising Pt, ZSM-48 and $WO_3$; and (j) a catalyst comprising Pt, ZSM-23 and $WO_3$, where each of (a) to (j) represents a catalyst comprising three components.

In a particular embodiment, the catalyst comprises 0.6 wt % Ni, ZSM-48 and $WO_3$, wherein the ratio of $SiO_2:Al_2O_3$ is 80:1 or less, and wherein the weight ratio of ZSM-48 to $WO_3$ is 8:2.

In another particular embodiment, the catalyst comprises 3 wt % Ni and 20 wt % W, ZSM-48 and alumina, wherein the ratio of $SiO_2:Al_2O_3$ is 80:1 or less, and wherein the weight ratio of ZSM-48 to alumina is 65:35.

In yet another particular embodiment, the catalyst comprises 0.6 wt Pt, ZSM-48 and $Nb_2O_5$, wherein the ratio of $SiO_2:Al_2O_3$ is 80:1 or less, and wherein the weight ratio of ZSM-48 to $Nb_2O_5$ is 8:2.

In yet another particular embodiment, the catalyst comprises 0.6 wt % Pt, ZSM-48 and $La_7O_3$, wherein the ratio of $SiO_2:Al_2O_3$ is 80:1 or less, and wherein the weight ratio of ZSM-48 to $La_2O_3$ is 8:2.

In yet another particular embodiment, the catalyst comprises 0.6 wt Pt, ZSM-48 and $CeO_2$, wherein the ratio of $SiO_7:Al_2O_3$ is 80:1 or less, and wherein the weight ratio of ZSM-48 to $CeO_2$ is 8:2.

In yet another particular embodiment, the catalyst comprises 0.6 wt % Pt, CBV-901 and alumina, wherein the weight ratio of ZSM-48 to alumina is 8:2.

In yet another particular embodiment, the catalyst comprises 0.6 wt % Pt, ZSM-48 and $TiO_2$, wherein the ratio of $SiO_2:Al_2O_3$ is 90:1 or less, and wherein the weight ratio of ZSM-48 to $TiO_2$ is 65:35.

In yet another particular embodiment, the catalyst comprises 0.6 wt % Pt, ZSM-23 and alumina; wherein the weight ratio of ZSM-23 to alumina is 65:35.

In yet another particular embodiment, the catalyst comprises 0.6 wt % Pt, ZSM-48 and alumina, wherein the ratio of $SiO_2:Al_7O_3$ is 90 or less, and wherein the weight ratio of ZSM-48 to alumina is 65:35.

When a catalyst comprises a ternary metal component, a zeolite is selected from ZSM-48, ZSM-23, ZSM-50, ZSM-5, ZSM-22, ZSM-11, ferrierite, faujasite, beta, ZSM-12, MOR and a mixture thereof, and a hydrogenation component comprises at least three metals selected from Pt; Pd, Ag, Ni, Co, Mo, W, Rh, Re, and Ru, wherein at least one of the at least three metals is in either an oxide or sulfide form. In an embodiment, the zeolite is ZSM-48 or ZSM-23; and the hydrogenation component comprises (a) Ni, MoOx and WOx or (b) Co, MoOx and WOx, wherein x is in the range of 0.5 to 3.

In a particular embodiment, the catalyst comprises ZSM-48 and a hydrogenation component comprising Ni, MoOx and WOx, where x is in the range of 0.5 to 3, wherein the ratio of $SiO_2:Al_2O_3$ is 90 or less, and wherein the weight ratio of ZSM-48 to the hydrogenation component is 8:2.

EXAMPLES

Example 1

0.6 wt % Pt Impregnated 80/20 Steamed H-ZSM-48/WOx

The title catalyst (0.6 wt % Pt impregnated 80/20 ZSM-48/WOx) was prepared by the following method: material is first extruded as 80 wt % 70:1 $SiO_2:Al_2O_3$ ZSM-48 and 20 wt % tungsten oxide (designated as WOx). Charge the tungsten oxide to a Lancaster Muller and dry mull for 3 minutes. Dilute 28.6 TEAOH (Tetraethylammonium Hydroxide) in 66.1 g of de-ionized water and slowly add to the WOx. The WOx was mixed by hand in a beaker due to the low volume of material. Wet mull the mixture for 3 minutes. Add the ZSM-48 crystal to the peptized WOx and mull 10 minutes. Dilute 57.2 of TEAOH in 627.3 g of deionized water and add to the mull mix over a five minute period. Wet mull the mixture for 20 minutes or until the desired consistency is achieved. Extrude the mull mixture on a 2" Bonnot extruder using $\frac{1}{16}$" quadrulobe die inserts.

Pre-calcine the bound zeolite in flowing $N_2$ at 950° F. (510° C.) for 3 hours to start removing the structure directing agent from the zeolite. Ammonium-exchange the formed material two times (5 ml of 1 M $NH_4NO_3$ solution per gram of catalyst) under ambient conditions to remove the alkali cations from the structure. After completing the second exchange wash the material with de-ionized water for one hour. Dry at 250° F.' (121° C.) overnight in a forced draft oven. To create the acid form of the catalyst, calcine the extrudate in air for 6 hours at 1000° F. (538° C.) in air.

Place the acid form of the catalyst into a vertical steamer. Bring catalyst up to 650° F. (343° C.) in air and hold at temperature for 30 minutes, Switch from air to steam over a 30-minute period. Ramp the temperature of the steamer to 700° F. (371° C.), allow the temperature in the bed to stabilize, and hold for 3 hours at 700° F. in 100% steam. Cool down in air and remove the catalyst from the steamer.

impregnate the steamed acid form of the catalyst using a tetraamine platinum nitrate solution via spray impregnation targeting a metal loading of 0.6 wt % Pt. Spray in the impregnating solution slowly; after the solution has been applied continue mixing for 20 minutes to insure that the solution is uniformly distributed across all of the extrudates. Dry at ambient conditions in an open dish. Dry for 2 hours in a forced air oven at 250° F. Complete the impregnation by calcining the extrudate in air at 680° F. (360° C.) for 3 hours.

The finished catalyst had 0.56 wt % Pt on catalyst. Dispersion of Pt was measure by $H_2$ chemisorption, a H/Pt molar ratio of 4.02 was observed, indicating high degree of Pt dispersion (equivalent to smaller Pt particles on catalyst).

Example 2

80/20 H-ZSM-48/NiMoWOx

The title catalyst (80/20 H-ZSM-48/NiMoWOx) was prepared by the following method: charge the NiMoWOx to a Lancaster Muller and dry mull for 3 hours. Dilute 28.6 g of 35 wt % TEAOH in 66.1 g of de-ionized water. Slowly add the solution to the NiMoWOx. Wet mull the mixture for 3 minutes. Add the ZSM-48 crystal to the peptized NiMoWOx and mull 10 minutes. Dilute 57.2 g of 35 wt % TEAOH in 680.2 g of de-ionized water. Add the solution to the mull mix over a five minute period. Wet mull for 20 minutes or until reasonable consistency is achieved. Extrude the mull mix on a 2" Bonnot extruder equipped with a die plate using $\frac{1}{16}$" quadrulobe die inserts. Dry in a forced air oven at 250° F. to dry the extrudate.

Pre-calcine the extrudate in flowing nitrogen at 950° F.' for 3 hours. Ammonium-exchange the extrudate two times under ambient conditions (5 ml of 1 N $NH_4NO_3$ solution per gram of catalyst). After the completion of two exchanges, wash with Di water for 1 hour at room temperature, drain, and dry under ambient conditions. Dry at 250° F. overnight in a forced draft oven. Heat the extrudate under nitrogen to 752° F. (300° C.) for 3 hours. Lower the temperature of the oven to 700° F. and begin introducing air over a 3 hour period. The final air calcination should be completed at 1,000° F. under air for 10 hours.

Loadings of metal on the finished catalyst were 3.45 wt % W, 2.41 wt % Ni, and 1.92 wt % Mo.

Example 3

3 Wt % Ni and 20 Wt % W Impregnated 65/35 ZSM-48/Alumina (V-300)

The title catalyst (3 wt % Ni and 20 wt % W impregnated 65/35 ZSM-48/V-300) was prepared by the following method: charge 1,639 g of ZSM-48 (SiO$_2$:Al$_2$O$_3$=70:1) crystal to the muller and mull for 10 minutes. Add 1153 g of Versal-300 alumina to the muller and mull for 10 minutes. Slowly add 1547 g of de-ionized water to mull mix while mulling. Mull the mixture for 40 minutes or until a reasonable mixture consistency is achieved. Extrude the mixture on the 2" Bonnot extruder using a die plate with $\frac{1}{20}$" quadrulobe inserts. After extrusion, dry at 250° F. in a forced draft oven.

Pre-calcine the extrudate prepared above for 3 hours at 1,000° F. in flowing nitrogen. After calcining the extrudate under inert conditions, exchange the material two times with ammonium nitrate (5 ml of 1 N NH$_4$NO$_3$ solution per gram of catalyst). After the second exchange wash the material with de-ionized water for 1 hour at room temperature, drain, and blow dry with air, Dry the exchanged material in a forced draft oven at 250° F. overnight. Calcine the ammonium form of the extrudate for 6 hours at 1,000° F. in air to create the acid form of the catalyst.

Impregnate the extrudate with 20 wt % W using ammonium metatungstate hydrate using a rotary spray impregnation technique. For example, 500 g of extrudate would be impregnated with 134 g of ammonium metatungstate hydrate dissolved in water. After the material is sprayed onto the catalyst the catalyst should be mixed for an additional 30 minutes to improve the homogeneity of the metal dispersion. Dry the extrudate for 4 hours at ambient conditions in a pan. Dry the catalyst overnight in a forced draft oven at 250° F. Calcine the extrudates in air at 900° F. for 1 hour.

The resulting catalyst had 14 wt % tungsten and 3 wt % Ni as measured by XRF analysis.

Example 4

0.6 wt % Ni Impregnated 80/20 Steamed H-ZSM-48/WOx

The title catalyst (0.6 wt % Ni impregnated 80/20 ZSM-48/WOx) was prepared by the following method: the 80:20 ratio of ZSM-48 and WOx extrudate formed in Example 1 is impregnated with 0.6 wt % Ni instead of 0.6 wt % Pt. Impregnate the steamed acid form of the catalyst using a nickel nitrate hexahydrate solution via spray impregnation targeting a metal loading of 0.6 wt % Ni. Spray in the impregnating solution slowly; after the solution has been applied continue mixing for 30 minutes to insure that the solution is uniformly distributed across all of the extrudates. Dry the extrudate for 4 hours at ambient conditions in a pan. Dry the catalyst overnight in a forced draft oven at 250° F. Calcine the extrudates in air at 900° F. for 3 hours. The finished catalyst contained 0.69 wt % Ni.

Example 5

0.6 wt % Pt Impregnated 80/20 Steamed H-ZSM-48/Niobium Oxide

The title catalyst (0.6 wt % Pt impregnated 80/20 ZSM-48/niobium oxide) was prepared by the following method: material is first extruded as 80 wt % 70:1 SiO$_2$:Al$_2$O$_3$ ZSM-48 and 20 wt % niobium oxide. Charge the niobium oxide to a Lancaster Muller and dry mull for 3 minutes. Dilute 17.1 g of 35 wt % TEAOH in 39.7 g of de-ionized water and slowly add to the niobium oxide. Wet mull the mixture for 3 minutes. Add the ZSM-48 crystal to the peptized niobium oxide and mull for 10 minutes. Dilute 34.3 g of 35 wt % TEAOH in 356.2 g of deionized water and add to the mull mix over a 5 minute period. Wet mull the mixture for 20 minutes or until the desired consistency is achieved. Extrude the mull mixture on a 2" Bonnot extruder using $\frac{1}{16}$" quadrulobe die inserts.

Pre-calcine the bound zeolite in flowing N$_2$ at 950° F. for 3 hours to start removing the structure directing agent from the zeolite. Ammonium-exchange the formed material two times (5 ml of 1 M NH$_4$NO$_3$ solution per gram of catalyst) under ambient conditions to remove the alkali cations from the structure. After completing the second exchange wash the material with de-ionized water for one hour. Dry at 250° F.' overnight in a forced draft oven. To create the acid form of the catalyst, calcine the extrudate in air for 6 hours at 1,000° F. in air.

Place the acid form of the catalyst into a vertical steamer. Bring catalyst up to 650° F. in air and hold at temperature for 30 minutes. Switch from air to steam over a 30-minute period. Ramp the temperature of the steamer to 700° F., allow the temperature in the bed to stabilize, and hold for 3 hours at 700° F. in 100% steam. Cool down in air and remove the catalyst from the steamer.

Impregnate the steamed acid form of the catalyst using a tetraamine platinum nitrate solution via spray impregnation targeting a metal loading of 0.6 wt % Pt. Spray in the impregnating solution slowly; after the solution has been applied continue mixing for 20 minutes to insure that the solution is uniformly distributed across all of the extrudates. Dry at ambient condition in an open dish. Dry for 2 hours in a forced air oven at 250° F. Complete the impregnation by calcining the extrudate in air at 680° F. for 3 hours.

H$_2$ chemisorption revealed a Pt dispersion of H/Pt=0.73.

Example 6

0.6 wt % Pt Impregnated 80/20 Steamed H-ZSM-48/La$_2$O$_3$

The title catalyst (0.6 wt % Pt impregnated 80/20 ZSM-48/La$_2$O$_3$) was prepared by the following method: the material is first extruded as 80 wt % 70:1 SiO$_2$:Al$_2$O$_3$ ZSM-48 and 20 wt % lanthanum oxide. Charge 125 g of lanthanum oxide to a Lancaster Muller and dry mull for 3 minutes. Dilute 17.1 g of 35 wt % TEAOH in 29.7 g of de-ionized water and slowly add the solution to the lanthanum oxide. Wet mull the mixture for 3 minutes. Add the ZSM-48 crystal to the peptized lanthanum oxide and mull 10 minutes. Dilute 34.3 g of 35 wt % TEAOH in 356.2 g of deionized water and add to the mull mix over a 5-minute period, Wet mull the mixture for 20 minutes or until the desired consistency is achieved. Extrude the mull mixture on a 2" Bonnot extruder using $\frac{1}{16}$" quadrulobe die inserts.

Pre-calcine the bound zeolite in flowing N$_2$ at 950° F. for 3 hours to start removing the structure directing agent from the zeolite. Ammonium-exchange the formed material two times (5 ml of 1 M NH$_4$NO$_3$ solution per grain of catalyst) under ambient conditions to remove the alkali cations from the structure. After completing the second exchange wash the material with de-ionized water for one hour. Dry at 250° F. overnight in a forced draft oven. To create the acid form of the catalyst, calcine the extrudate in air for 6 hours at 1,000° F. in air.

Place the acid form of the catalyst into a vertical steamer. Bring catalyst up to 650° F.' in air and hold at temperature for 30 minutes. Switch from air to steam over a 30-minute period. Ramp the temperature of the steamer to 700° F., allow the temperature in the bed to stabilize, and hold for 3 hours at 700° F. in 100% steam. Cool down in air and remove the catalyst from the steamer.

Impregnate the steamed acid form of the catalyst using a tetraamine platinum nitrate solution via spray impregnation targeting a metal loading of 0.6 wt % Pt. Spray in the impregnating solution slowly; after the solution has been applied continue mixing for 20 minutes to insure that the solution is uniformly distributed across all of the extrudates. Dry at ambient conditions in an open dish. Dry for 2 hours in a forced air oven at 250° F. Complete the impregnation by calcining the extrudate in air at 680° F. for 3 hours.

The finished catalyst had 0.56 wt % Pt on catalyst. $H_2$ chemisorption revealed a Pt dispersion of H/Pt=1.18.

Example 7

0.6 wt % Pt Impregnated 80/20 Steamed H-ZSM-48/$CeO_2$

The title catalyst (0.6 wt % Pt impregnated 80/20 ZSM-48/$CeO_3$) was prepared by the following method: the material is first extruded as 80 wt % 70:1 $SiO_2$:$Al_2O_3$ ZSM-48 and 20 wt % cerium oxide. Charge 122 g of cerium oxide to a Lancaster Muller and dry mull for 3 minutes. Dilute 17.1 g of 35 wt % TEAOH in 39.7 g of de-ionized water and slowly add the solution to the cerium oxide. Wet mull the mixture for 3 minutes. Add the ZSM-48 crystal to the peptized lanthanum oxide and mull 10 minutes. Dilute 34.3 g of 35 wt % TEACH in 419.7 g of deionized water and add to the mull mix over a 5-minute period. Wet mil the mixture for 20 minutes or until the desired consistency is achieved. Extrude the mull mixture on a 2" Bonnot extruder using 1/16" quadrulobe die inserts.

Pre-calcine the bound zeolite in flowing $N_2$ at 950° F. for 3 hours to start removing the structure directing agent from the zeolite. Ammonium-exchange the formed material two times (5 ml of 1 M $NH_4NO_3$ solution per gram of catalyst) under ambient conditions to remove the alkali cations from the structure. After completing the second exchange wash the material with de-ionized water for one hour. Dry at 250° F. overnight in a forced draft oven. To create the acid form of the catalyst, calcine the extrudate in air for 6 hours at 1,000° F. in air.

Place the acid form of the catalyst into a vertical steamer. Bring catalyst up to 650° F. in air and hold at temperature for 30 minutes. Switch from air to steam over a 30-minute period. Ramp the temperature of the steamer to 700° F., allow the temperature in the bed to stabilize, and hold for 3 hours at 700° F. in 100% steam. Cool down in air and remove the catalyst from the steamer.

Impregnate the steamed acid form of the catalyst using a tetraamine platinum nitrate solution via spray impregnation targeting a metal loading of 0.6 wt % Pt. Spray in the impregnating solution slowly; after the solution has been applied continue mixing for 20 minutes to insure that the solution is uniformly distributed across all of the extrudates. Dry at ambient conditions in an open dish. Dry for 2 hours in a forced air oven at 250° F. Complete the impregnation by calcining the extrudate in air at 680° F. for 3 hours.

The finished catalyst had 0.42 wt % Pt on catalyst. $H_2$ chemisorption revealed a Pt dispersion of H/Pt=0.78.

Example 8

0.6 wt % Pt Impregnated 80/20 CBV-901/Alumina

The title catalyst (0.6 wt % Pt impregnated 80/20 CBV-901/alumina) was prepared by the following method: the material is first extruded as a 80 wt % CBV-901 and 20 wt % Versal 300 alumina composite using the following procedure. Charge 808 g of CBV-901 USY crystal to a Lancaster Muller and dry mull for 5 minutes. Dilute 10 g of acetic acid with 690 g of de-ionized water. Dissolve 5 g of polyvinylacetate (PVA) in the acetic acid solution. Slowly add the acid/PVA solution to the zeolite over 5 minutes and mull the mixture for 10 minutes. Add 275 g of Versal-300 alumina to the muller and mull for an additional 10 minutes. Add the remaining 173 g of dc-ionized water to the mull mix over 3 minutes and mull 3 minutes or until reasonable consistency is achieved. Extrude the mull mixture on a 2" Bonnot extruder using 1/16" quadrulobe die inserts. Dry the extrudates at 250° F. Calcine the dried extrudates in air at 1,000° F.' for 6 hours.

Impregnate the acid form of the catalyst using a tetraamine platinum nitrate solution via spray impregnation targeting a metal loading of 0.6 wt % Pt. Spray in the impregnating solution slowly; after the solution has been applied continue mixing for 20 minutes to insure that the solution is uniformly distributed across all of the extrudates. Dry at ambient conditions in an open dish. Dry for 2 hours in a forced air oven at 250° F. Complete the impregnation by calcining the extrudate in air at 680° F. for 3 hours.

Example 9

0.6 wt % Pt Impregnated 65/35 Steamed H-ZSM-48/$TiO_2$

The title catalyst (0.6 wt % Pt impregnated 65/35 ZSM-48/$TiO_2$) was prepared by the following method: the material is first extruded as 65 wt % 90:1 $SiO_2$:$Al_2O_3$ ZSM-48 and 35 wt % titanium oxide. Charge the ZSM-48 to the muller and mull for 10 minutes. Add 214 g of DT-51 titania to muller and mull for 10 minutes. Slowly add 488 g of de-ionized water to mull mix while mulling. Mull the mixture for 30 minutes or until the mixture reaches the desired consistency to extrude properly. Extrude mixture on a 2" Bonnot extruder equipped with a die plate using 1/16" quadrulobe inserts. Dry the extrudate at 250° F. in a forced draft oven.

Pre-calcine the bound zeolite in flowing $N_2$ at 1,000° F. for 3 hours to start removing the structure directing agent from the zeolite. Ammonium-exchange the formed material two times (5 ml of 1 M $NH_4NO_3$ solution per gram of catalyst) under ambient conditions to remove the alkali cations from the structure. After completing the second exchange wash the material with de-ionized water for one hour. Dry at 250° F. overnight in a forced draft oven. To create the acid form of the catalyst, calcine the extrudate in air for 6 hours at 1,000° F. in air.

Place the acid form of the catalyst into a vertical steamer. Bring catalyst up to 700° F. in air and hold at temperature for 30 minutes. Switch from air to steam over a 30-minute period. Ramp the temperature of the steamer to 890° F., allow the temperature in the bed to stabilize, and hold for 3 hours at 890° F. in 100% steam. Cool down in air and remove the catalyst from the steamer.

Impregnate the steamed acid form of the catalyst using a tetraamine platinum nitrate solution via spray impregnation targeting a metal loading of 0.6 wt % Pt. Spray in the impregnating solution slowly; after the solution has been applied continue mixing for 20 minutes to insure that the solution is uniformly distributed across all of the extrudates. Dry at ambient conditions in an open dish. Dry for 2 hours in a forced air oven at 250° F. Complete the impregnation by calcining the extrudate in air at 680° F. for 3 hours.

H$_2$ chemisorption revealed a Pt dispersion of H/Pt=0.76.

Example 10

0.6 wt % Pt Impregnated 65/35 H-ZSM-23/Alumina

The title catalyst (0.6 wt % Pt impregnated 65/35 ZSM-23/alumina) was prepared by the following method: the material is first extruded as 65 wt % ZSM-23 and 35 wt % Versal 300 alumina. Charge the 433 g of ZSM-23 crystal to muller and dry mull for 15 minutes. Add the 248 g of Versal 300 alumina to the muller and dry mull for an additional 10 minutes. Slowly add 451.3 g of de-ionized water to the mull mix over 5 minutes and mull the mixture for 10 minutes or until reasonable consistency. Extrude the mixture on a 2" Bonnot extruder equipped with a die plate using 1/16" quadrulobe inserts. Dry the extrudate at 250° F. in a forced draft oven.

Pre-calcine the bound zeolite in flowing N$_2$ at 1,000° F. for 3 hours to start removing the structure directing agent from the zeolite. Ammonium-exchange the formed material two times (5 ml of 1 M NH$_4$NO$_3$ solution per gram of catalyst) under ambient conditions to remove the alkali cations from the structure. After completing the second exchange wash the material with de-ionized water for one hour. Dry at 250° F. overnight in a forced draft oven. To create the acid form of the catalyst, calcine the extrudate in air for 8 hours at 1,000° F. in air.

Impregnate the acid form of the catalyst using a tetraamine platinum nitrate solution via spray impregnation targeting a metal loading of 0.6 wt % Pt. Spray in the impregnating solution slowly; after the solution has been applied continue mixing for 20 minutes to insure that the solution is uniformly distributed across all of the extrudates. Dry at ambient conditions in an open dish. Dry for 2 hours in a forced air oven at 250° F. Complete the impregnation by calcining the extrudate in air at 680° F. for 3 hours.

The finished catalyst had 0.52 wt % Pt on catalyst. H$_2$ chemisorption revealed a Pt dispersion of H/Pt=1.25.

Example 11

0.6 wt % Pt Imgregnated 65/35 H-ZSM-48/Alumina

The title catalyst (0.6 wt % Pt impregnated 65/35 ZSM-48/alumina) was prepared by the following method: add 245 lbs. of ZSM-48 SiO$_2$/Al$_2$O$_3$ 90 to the muller. Mull the mixture for ten minutes. Add 162 lbs. of Versal 300 alumina. Mull the mixture for ten minutes after adding all of the alumina. Add 292 lbs. of de-ionized water while mulling. Mull the mixture for forty minutes or until reasonable consistency is achieved. Extrude the mixture on an extruder equipped with a die plate using 1/16" quadrulobe inserts. Dry the extrudate at 250° F. in a forced draft oven.

Pre-calcine the bound zeolite in flowing N$_2$ at 980° F. for 3 hours to start removing the structure directing agent from the zeolite. Ammonium-exchange the formed material two times (5 ml of 1 M NH$_4$NO$_3$ solution per gram of catalyst) under ambient conditions to remove the alkali cations from the structure. After completing the second exchange wash the material with de-ionized water for one hour. Dry at 250° F. overnight in a forced draft oven. To create the acid form of the catalyst, calcine the extrudate in air for 6 hours at 980° F. in air.

Place the acid form of the catalyst into a vertical steamer. Bring catalyst up to 650° F. in air and hold at temperature for 30 minutes. Switch from air to steam over a 30-minute period. Ramp the temperature of the steamer to 890° F., allow the temperature in the bed to stabilize, and hold for 3 hours at 890° F.' in 100% steam. Cool down in air and remove the catalyst from the steamer.

Impregnate the steamed acid form of the catalyst using a tetraamine platinum nitrate solution via spray impregnation targeting a metal loading of 0.6 wt % Pt. Spray in the impregnating solution slowly; after the solution has been applied continue mixing for 20 minutes to insure that the solution is uniformly distributed across all of the extrudates. Dry at ambient conditions in an open dish. Dry for 2 hours in a forced air oven at 250° F. Complete the impregnation by calcining the extrudate in air at 680° F. for 3 hours.

Example 12

Steaming of the 0.6 wt % Pt impregnated 65/35 ZSM-48/TiO$_2$

Place the Pt form of the catalyst from Example 8 into a vertical steamer. Bring catalyst up to 950° F. in air and hold at temperature for 30 minutes. Switch from air to steam over a 30 minute period. Ramp the temperature of the steamer to 1,000° F., allow the temperature in the bed to stabilize, and hold for 24 hours at 1,000° F. in 100% steam. Cool down in air and remove the catalyst from the steamer.

Example 13

Steaming of the 0.6 wt % Pt Impregnated 65/35 Alumina

Place the Pt form of the catalyst from Example 10 into a vertical steamer. Bring catalyst up to 950° F. in air and hold at temperature for 30 minutes. Switch from air to steam over a 30 minute period. Ramp the temperature of the steamer to 1,000° F., allow the temperature in the bed to stabilize, and hold for 24 hours at 1,000° F. in 100% steam. Cool down in air and remove the catalyst from the steamer.

Catalyst candidates were first screened through a "severe steaming process" which consisted of steaming each potential lead at 1,000° F. for 24 hours in order to examine the effects that exposure to water at high temperatures would have on the crush strength and metal dispersion of each material. Pt dispersions were measured by H$_2$ chemisorption. A promising lead candidate for this application would maintain its crush strength with minimal metal agglomeration. Catalyst from Example 11 was included in the study as a point of reference. The results of the severe steaming study are shown in Table 1.

TABLE 1

Summary of Steaming Study Results

| Example | Crush Strength before steaming (lb/in) | Crush Strength after steaming (lb/in) | H/Pt before steaming | H/Pt after steaming |
| --- | --- | --- | --- | --- |
| 1 | 18.06 | 25.33 | 0.49 | 0.43 |
| 8 | 152.31 | 129.38 | 1.37 | 0.172 |
| 9 | 30.69 | 25.75 | 0.76 | 0.2 |

TABLE 1-continued

Summary of Steaming Study Results

| Example | Crush Strength before steaming (lb/in) | Crush Strength after steaming (lb/in) | H/Pt before steaming | H/Pt after steaming |
|---|---|---|---|---|
| 10 | 79.01 | 78.52 | 1.26 | 0.407 |
| 11 | 156.05 | 132.35 | 1.31 | 0.195 |

It can be seen that the catalyst of Example 1 maintained metal dispersion (indicted by H/Pt) and showed slightly higher crush strength after severe steaming.

Example 14

Catalytic Testing for Dewaxing of Oxygenated Feeds

Catalytic testing was conducted on a High Pressure Heated Orbital Shaker high-throughput experimentation device, which is a collection of small batch reactors contained in a heated, high pressure enclosure. Individual batch reactors consist of a 40 min deep well with an internal volume of 5.15 cm³ each. Each individual well was charged with a catalyst along with 18-pentatriacontanone feed and run at 800 psig $H_2$, 350° C., and WHSV of 1 to 2 hr$^{-1}$ over a course of 24 hours. Without being bound to any theory or structural details, the reaction is schematically represented below. The results are shown in Table 2.

TABLE 2

Catalytic testing results

| Example | Conversion (%) | Epsilon Carbon, mole % | Total Pendant Groups, mole % | Pendant Methyl Groups, mole % | # Side Chains/ Molecule | Carbon # | Free Carbon Index |
|---|---|---|---|---|---|---|---|
| 1 | 91 | 22.03 | 9.44 | 7.17 | 1.87 | 26.08 | 5.75 |
| 2 | 98 | 10.23 | 10.94 | 8.24 | 2.44 | 29.57 | 3.03 |
| 3 | 91 | 22.55 | 7.95 | 5.72 | 1.52 | 26.47 | 5.97 |
| 5 | 99 | 10.19 | 13.35 | 9.70 | 2.28 | 23.54 | 2.40 |
| 6 | 100 | 22.07 | 10.04 | 7.86 | 2.33 | 29.64 | 6.54 |
| 7 | 100 | 12.13 | 12.76 | 9.43 | 2.28 | 24.16 | 2.93 |
| 9 | 100 | 8.41 | 13.15 | 10.08 | 2.96 | 29.40 | 2.47 |
| 11 | 100 | 4.75 | 14.22 | 10.41 | 2.68 | 25.78 | 1.22 |

Under the conditions tested, all catalysts disclosed herein effectively dewaxed the ketone feed (conversions of ketone >90%) giving liquid products.

The products were characterized using quantitative $^{13}$C NMR. Quantitative $^{13}$C NMR spectra were Obtained using Cr(acac)$_3$ as a relaxation aid during acquisition. For example, all normal paraffins with carbon numbers greater than $C_9$ have only five inequivalent carbon NMR absorptions, corresponding to the terminal methyl carbons ($\alpha$), methylene carbons at the second, third, and fourth positions from the molecular ends ($\beta$, $\gamma$ and $\delta$, respectively), and the other carbon atoms along the backbone that have a common shift ($\epsilon$). The intensities of $\alpha$, $\beta$, $\gamma$ and $\delta$ are equal and the intensity of $\epsilon$ carbons depends on the length of the molecule. Similarly, side branches on the backbone of an iso-paraffin have unique chemical shifts and the presence of side-chain causes a unique shift at the tertiary site on the backbone to which it is anchored. It also perturbs the chemical shifts within three sites of the tertiary site, imparting unique chemical shifts ($\alpha'$, $\beta'$ and $\gamma'$) to the adjacent sites when they occur in the center of a long backbone. The number of free ends of molecules can be estimated by measuring the number of $\alpha$, $\beta$, $\gamma$ and $\delta$ carbons. Unique shifts also enable measuring the number of pendant side-chains of different length (which are called P-Me, P-Et, P-Pr, and P-Bu). The molecular ends that have a side branch at the 2, 3, 4, or 5 sites (which are called T-Me, T-Et, T-Pr and T-Bu) can also be measured. The branching features are particularly valuable in characterizing lube basestocks.

The products can be characterized by the "Free Carbon index", which represents the measure of carbon atoms in an average molecule that are epsilon carbons:

$$FCI=(\% \text{ epsilon carbons}) \times (\text{Carbon Number})/100,$$

where the Carbon Number is determined by $^{13}$C NMR as following:

Carbon Number=2/((mole % $\alpha$ carbon+mole % T-Me carbon+mole % T-Et carbon+mole % T-Pr carbon)/100)

$^{13}$C NMR also revealed that the products are significantly free of carbonyl carbon, consistent with high conversions seen by GC. The dewaxed products had, on average, 1-3 side chain per molecule, indicating effective dewaxing of the ketone feed.

All documents described herein are incorporated by reference herein, including any priority documents and/or testing procedures to the extent they are not inconsistent with this text. As is apparent from the foregoing general description and the specific embodiments, while forms of the disclosure have been illustrated and described, various modifications can be made without departing from the spirit and scope of the disclosure. Accordingly, it is not intended that the disclosure be limited thereby. Likewise, the term "comprising" is considered synonymous with the term "including" for purposes of Australian law.

When numerical lower limits and numerical upper limits are listed herein, ranges from any lower limit to any upper limit are contemplated.

While the illustrative embodiments of the disclosure have been described with particularity, it will be understood that various other modifications will be apparent to and can be readily made by those skilled in the art without departing from the spirit and scope of the disclosure. Accordingly, it is not intended that the scope of the claims appended hereto be limited to the examples and descriptions set forth herein but rather that the claims be construed as encompassing all the features of patentable novelty which reside in the present disclosure, including all features which would be treated as equivalents thereof by those skilled in the art to which the disclosure pertains.

What is claimed is:

1. A catalyst comprising:
   a zeolite component selected from a zeolite having 10-member ring pores, wherein the zeolite component is ZSM-48,
   0.1 to 5 weight % of a hydrogenation component selected from Ag, Re and a binary mixture thereof, and
   a hydrothermally stable binder component selected from tungsten oxide,
   wherein the weight ratio of the zeolite component to the hydrothermally stable binder component is about 80:20.

2. The catalyst of claim 1, wherein the ratio of $SiO_2:Al_2O_3$ of the zeolite component is 200 or less.

* * * * *